United States Patent
Cooper, Sr.

(10) Patent No.: US 6,245,284 B1
(45) Date of Patent: Jun. 12, 2001

(54) HEAD FITTER

(76) Inventor: Billy Ray Cooper, Sr., 20244 W. Seneca Dr., Sand Springs, OK (US) 74063

( * ) Notice: Subject to any disclaimer, the term of this patent is extended or adjusted under 35 U.S.C. 154(b) by 0 days.

(21) Appl. No.: 09/477,887

(22) Filed: Jan. 5, 2000

(51) Int. Cl.⁷ ................................................ B23K 37/04
(52) U.S. Cl. .................... 266/61; 266/48; 266/77
(58) Field of Search ................ 266/48, 77, 61, 266/62, 63

(56) References Cited

U.S. PATENT DOCUMENTS

| | | | |
|---|---|---|---|
| 1,439,043 | * 12/1922 | Waterloo | 266/77 |
| 2,489,201 | * 11/1949 | Schrock | 266/48 |
| 2,816,848 | * 12/1957 | Maxon, Jr. | 266/77 |
| 4,121,747 | 10/1978 | McFatter | 228/17.7 |
| 4,142,284 | 3/1979 | Steuber | 29/417 |
| 4,494,291 | 1/1985 | Morrison | 29/281.4 |
| 4,618,757 | 10/1986 | Cabany et al. | 219/60 R |
| 4,964,497 | 10/1990 | Bundo et al. | 198/341 |
| 5,012,745 | 5/1991 | Yamashita | 104/44 |
| 5,586,391 | 12/1996 | Micale | 29/897.2 |
| 5,921,459 | 7/1999 | Heraly et al. | 228/45 |
| 6,113,845 | * 9/2000 | Contreras | 266/48 |

* cited by examiner

Primary Examiner—Scott Kastler
(74) Attorney, Agent, or Firm—Molly D. McKay

(57) ABSTRACT

A device for fabricating a tank head prior to attachment to a tank. A movable turntable of the invention holds the tank head horizontally on its rotatable top surface. The movable turntable travels on rails so that is can move the tank head under an overhead frame of the invention. The overhead frame is provided with frame rails on which a movable burner and a movable attachment holder independently travel so that they can be accurately positioned over the head. The movable burner can be lowered and raised in order to cut holes in the head at desired locations on the head. The movable attachment holder and an attachment that is removably secured to the attachment holder can also be lowered and raised in order to properly position the attachment relative to a hole in the head so that the attachment can be tack welded to the head.

10 Claims, 7 Drawing Sheets

HEAD FITTER

BACKGROUND OF THE INVENTION

1. Field of the Invention

The present invention relates to a head fitter to assist in fitting a head of a head with openings and attachments associated with those openings prior to attaching the head to the tank. More specifically the present invention is a head fitter for assisting in measuring and aligning a head so that holes can be cut in the head and so the appropriate flanges, valves, nozzles, or other attachments can be welded onto the head in association with the holes therein.

2. Description of the Related Art

The current procedure for fitting a tank head with openings for flanges, valves, etc. is to manually lift a head onto blocks so that the head can be strapped, i.e. the outside dimension or OD determined by measuring the outside circumference of the head. Once the OD has been determined, the OD is divided by 360 to arrive at the distance between each radial degree as measured on the outside circumference of the head.

Next, dividers are used to step off over the top of the head to mark the 0–180 degree line and to mark the 90–270 degree line. The 0–180 degree line is a straight line drawn over the top of the head so that the line passes through the 0 degree point on the outside perimeter of the head and through the 180 degree point on the outside perimeter of the head. This 0–180 degree line will pass through the center point of the head. Also a second line that passes through the center point of the head is drawn on the head. For example, if a 90–270 degree line is drawn as the second line over the top of the head, then this second line passes through the 90 degree point on the outside perimeter of the head and through the 270 degree point on the outside perimeter of the head. This second line will also pass through the center point of the head and will be perpendicular to the 0–180 degree line. The intersection of the 0–180 degree line and the 90–270 degree line is the center point of the head.

The next step is to lay out the location of each opening that is to be created in the head. This location consists of two components: the desired degree for the opening relative to the 0 degree point and the desired distance of the hole from the center point of the head, as measured along the desired radius.

For example, for an opening that are a given degree and a given distance from the center point of the head, the proper distance from the line is determined by multiplying the desired number of degrees from the 0 point on the outside perimeter of the head by the distance on the outside perimeter of the head previously calculated to represent one degree. The product of this calculation is the distance from the 0 point to the desired degree on the outside perimeter of the head. This distance is then measured and marked as the desired degree on the perimeter of the head and a radius is drawn from the marked desired degree to the center point of the head. Next, a level and measuring tape and a level are used to determine the point on the previously drawn desired degree radius line that is the desired distance from the center of the head, measuring perfectly horizontally. It is important that a level be employed to make sure that the desired distance is measured horizontally since the head is generally rounded in configuration and a measurement along the surface of the head would locate the opening incorrectly. A level is employed to mark the point on the desired degree radius line directly under the measuring tape. This process is repeated until all openings are marked.

The holes then are cut via a cutting torch. The holes are then beveled and a grinder is employed to clean the holes so attachments can be welded to the head around the holes. The attachments may be valves, flanges, nozzles, etc.

Before an attachment can be spot welded to the head in association with a hole, the attachment must be properly aligned with the hole. This alignment involves orienting the attachment perpendicular relative to the horizon, not relative to the curved surface of the head and involves positioning the attachment so that its nozzle, valve or flange is in the proper orientation relative to the hole. This later alignment is referred to in the trade a two holing the attachment since it generally involves orienting the even number of holes in the attachment's flange symmetrically with respect to a line on the head. For example, a flange that is two holed with respect to the 0–180 degree line on the head would have its flange openings symmetrically arranged with respect to a line that is parallel to the 0–180 degree line of the head and none of the flange openings would not on the line that is parallel to the 0–180 degree line.

In order to hold an attachment adjacent to a hole in the head in the proper vertical position and with the attachment two holed, it is first necessary to weld nozzle jacks onto the head. These nozzle jacks surround the hole and hold the attachment vertically over the hole in the proper two holed position while the attachment is tack welded to the head. Once the attachment has been tack welded to the head, the nozzle jacks are cut off of the head with a cutting torch and the place of attachment is ground smooth with a grinder. Once the nozzle jacks are removed, the attachment is welded completely to the head. This process is repeated until all the attachments have been properly positioned and welded to the head in association with the holes.

This current procedure for fitting a tank head is dangerous, labor intensive, costly, and involves a number of steps that can result in improper hole creation in the head and improper orientation of attachments to the head.

The present invention addresses these problems be providing a device for assisting in moving and rotating the head, assists in locating the location for holes, assists in cutting the holes in the head and assists in holding and positioning attachments relative to the holes in the head so that they can be tack welded to the head. By employing the present invention to fit tank heads, the job is a great deal less dangerous. Also by employing the present invention to fit tank heads, the job can be accomplished more quickly, with less labor, at less cost, and with fewer errors.

The present invention consists of a movable turntable that holds the tank head horizontally on its rotatable top surface. The movable turntable travels on rails so that is can move the tank head parallel with the ground and perpendicular to an overhead frame of the invention. The overhead frame straddles the turntable and the rails on which the turntable travels. The overhead frame is provided with frame rails on which a movable burner and a movable attachment holder travel. The movable burner can move along the frame rails to position it over the tank head and can be lowered and raised in order to cut holes in the head at desired locations on the head. The movable attachment holder can also move along the frame rails to position it and an attachment that is secured to the attachment holder over the tank head. The movable attachment holder can be lowered and raised in order to properly position attachments relative to the holes in the head so that the attachments can be tack welded to the head.

SUMMARY OF THE INVENTION

The present invention is a movable turntable that holds a tank head horizontally on its rotatable top surface and an associated overhead frame that is provided with a movable burner and a movable attachment holder. To employ the invention to fit a tank head with openings and attachments such as nozzles, valves or flanges associated with the holes, the head of a tank is laid on the rotatable top surface of the movable turntable so that the outside surface of the head is facing upward.

The movable turntable is provided with wheels that travel on parallel turntable rails. Once the head has been properly centered on the top surface of the turntable, the turntable is rolled on the rails so that the tank head moves parallel with the ground and rolls under the overhead frame of the invention. The parallel turntable rails lie perpendicular to frame rails provided on the overhead frame. The overhead frame and its two parallel frame rails straddle the turntable, straddle the head that is positioned on the turntable, and straddle the turntable rails on which the turntable travels.

The top surface of the turntable is capable of rotating relative to a non-rotatable lower portion of the turntable. To facilitate rotation of the top surface, the turntable is provided with a center pivot post that allows the top surface to rotate relative to the center of the turntable and is provided with bearings between the lower portion of the turntable and the top surface as a means for rotatably supporting the top surface on the lower portion of the turntable.

A turntable motor is provided on the turntable as a motorized means for rotating the top surface of the turntable relative to the non-rotatable lower portion of the turntable.

A movable burner and a movable attachment holder travel along the frame rails. The movable burner is mounted on a lower end of a burner ram that can be lowered and raised relative to the head via one or more burner ram motors, and the burner ram movably attaches to a burner carriage that can move along the frame rails to position it over the tank head via a burner carriage motor. Thus, the movable burner can be accurately positioned over the head in order to cut holes in the head at desired locations on the head.

The movable attachment holder is mounted on a lower end of a holder ram that can be lowered and raised relative to the head via one or more holder ram motors, and the holder ram movably attaches to a holder carriage that can also move along the frame rails to position the attachment holder it over the tank head via a holder carriage motor. An attachment, such as for example a valve, nozzle, or flange, removably attaches to the attachment holder. Thus, the movable attachment holder and the attachment can be accurately positioned over the head to properly position the attachment relative to a hole in the head so that the attachment can be tack welded to the head.

A table is provided on one side of the overhead frame to serve as a workstation for removably securing attachments to the attachment holder.

The invention is provided with a laser light turntable pointer on the turntable and with an associated horizontal scale on the frame as a means of properly positioning the turntable and the head horizontally relative to the overhead frame. In addition, the invention is provided with laser light ram pointers on each of the rams and with vertical scales on the four legs of the frame as a means of checking and adjusting the vertical orientation of the rams. Each ram is secured to its associated carriage via adjustable rollers so that the vertical orientation of the ram can be adjusted to cause the ram to be perfectly vertical.

The invention is also provided with a 0–360 degree scale on the perimeter of the top surface of the turntable and an associated turntable pointer on the non-rotatable lower portion of the turntable. This 0–360 degree scale and associated turntable pointer allow the top surface and the head to be properly positioned relative to the turntable pointer on the non-rotatable lower portion of the turntable so that holes can be cut in the head at the desired degree from the 0 degree point without the need to draw lines on the head.

DETAILED DESCRIPTION OF THE PREFERRED EMBODIMENT

The Invention

Figure 1:
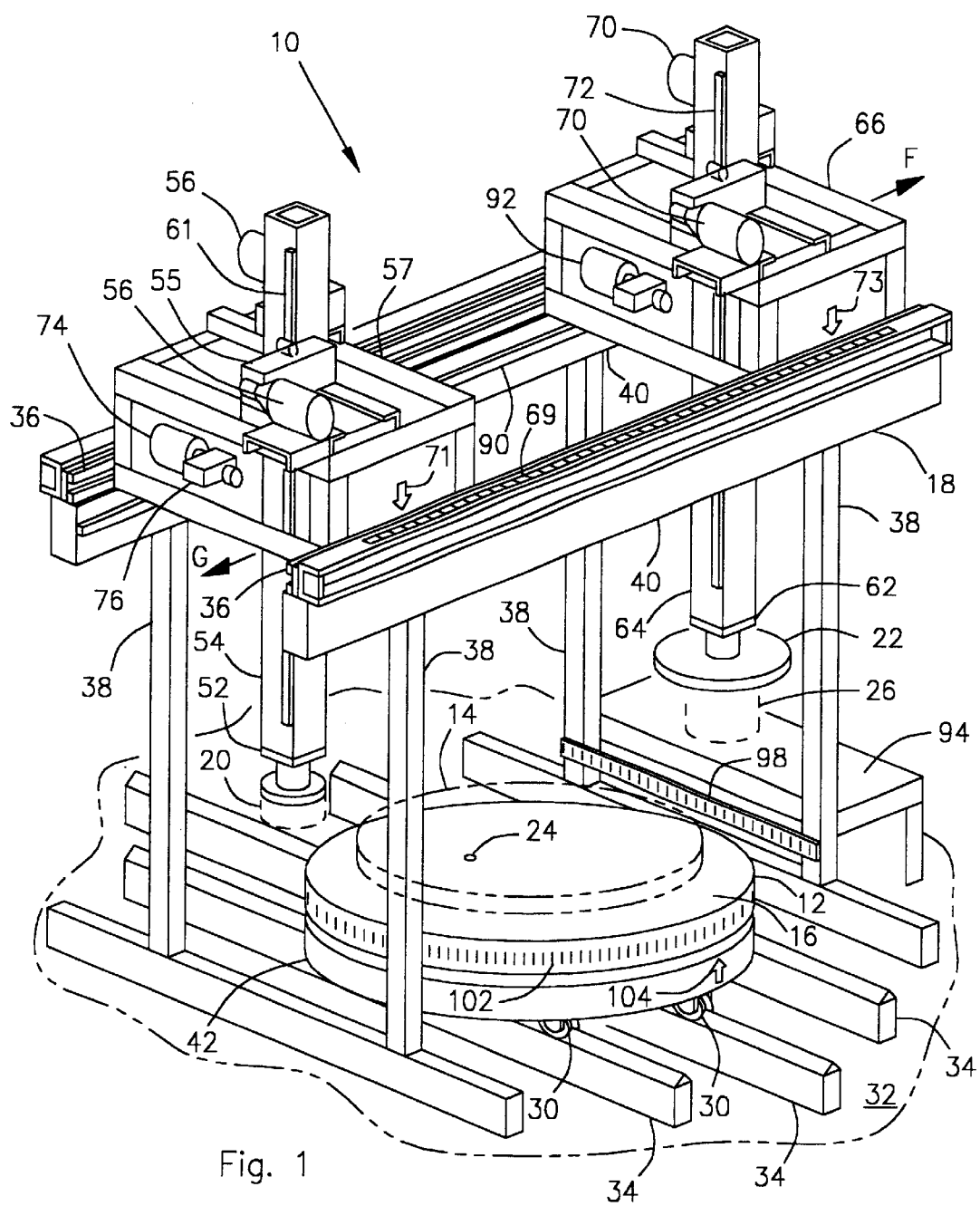
FIG. 1 is a perspective view of a head fitter constructed in accordance with a preferred embodiment of the present invention.

Referring now to the drawings and initially to FIG. 1, there is illustrated a head fitter 10 that is constructed in accordance with a preferred embodiment of the present invention. The head fitter 10 comprises a movable turntable 12 that holds a tank head 14 horizontally on its rotatable top surface 16 and an associated overhead frame 18 that is provided with a movable burner 20 and a movable attachment holder 22. To employ the head fitter 10 to fit a tank head 14 with openings or holes 24 and with attachments 26 such as nozzles, valves or flanges, associated with the holes 24, the head 14 is placed on the rotatable top surface 16 of the movable turntable 12 so that the outside or exterior surface 28 of the head 14 is facing upward.

Figure 2:
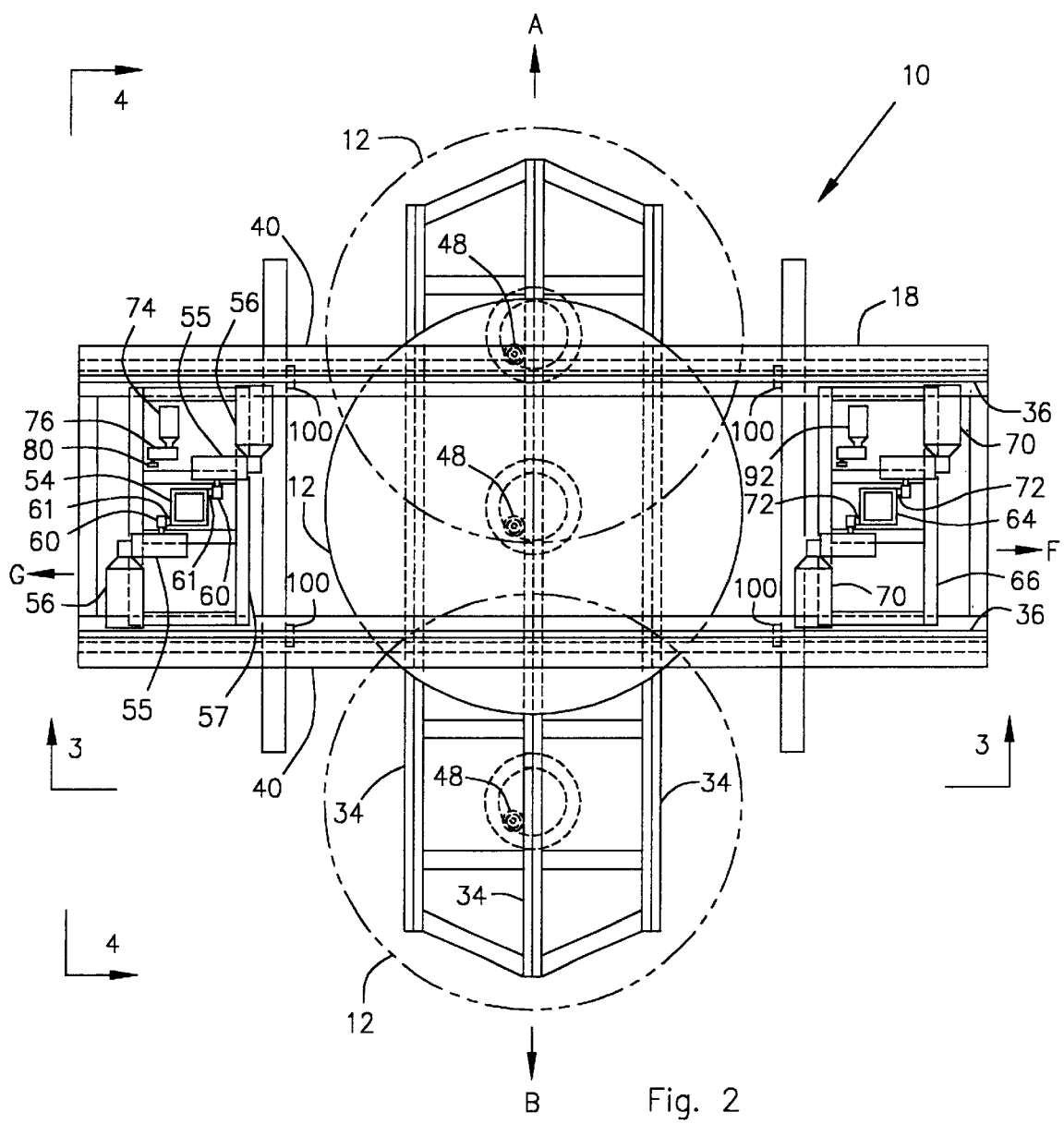
FIG. 2 is a top plan of the head fitter of FIG. 1, showing the turntable in three different positions relative to the overhead frame.
Figure 3:
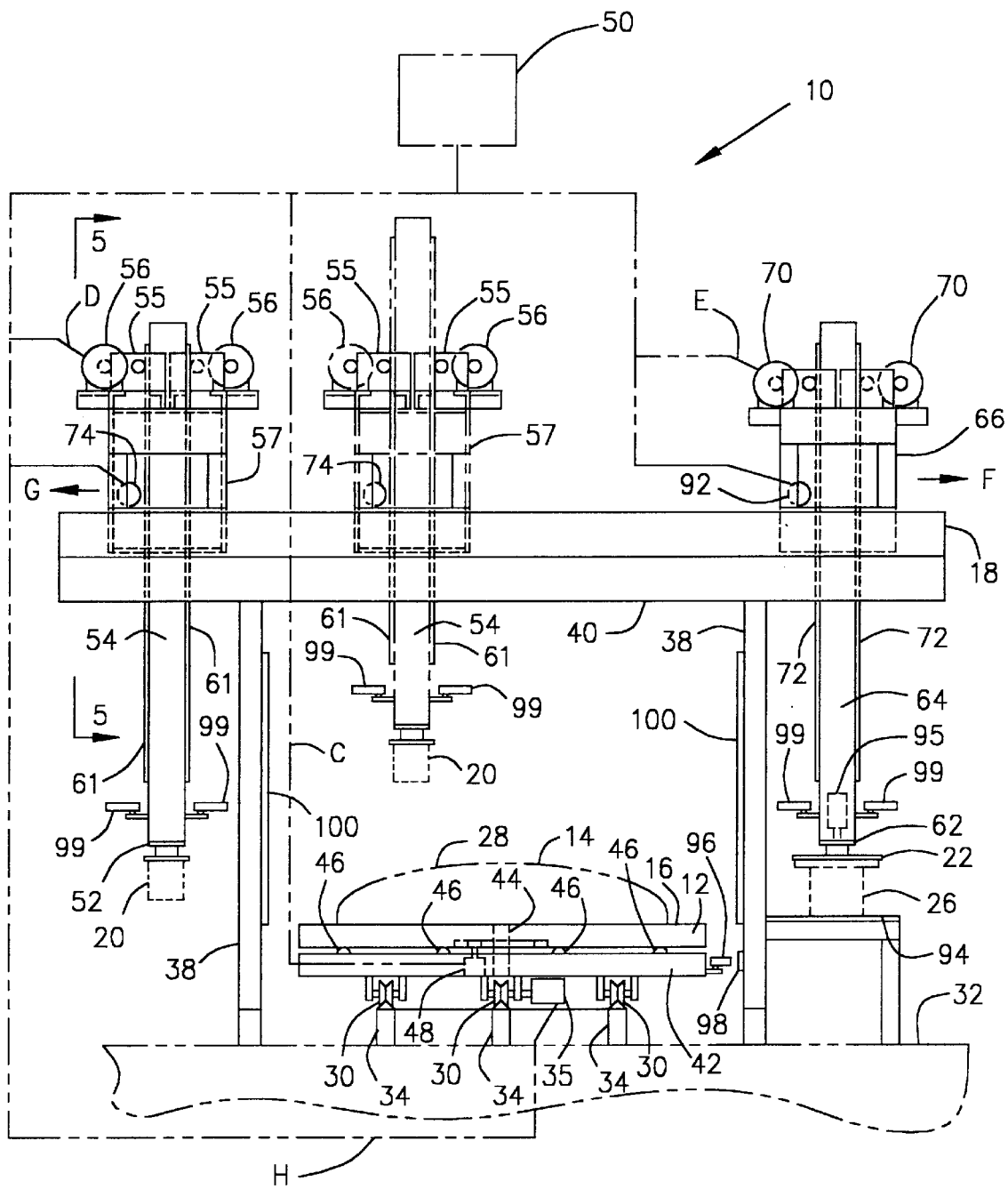
FIG. 3 is a front plan of the head fitter of FIG. 1 taken along line 3—3 of FIG. 2, showing the burner in two different positions relative to the head and showing electrical connections to the motors.
Figure 4:
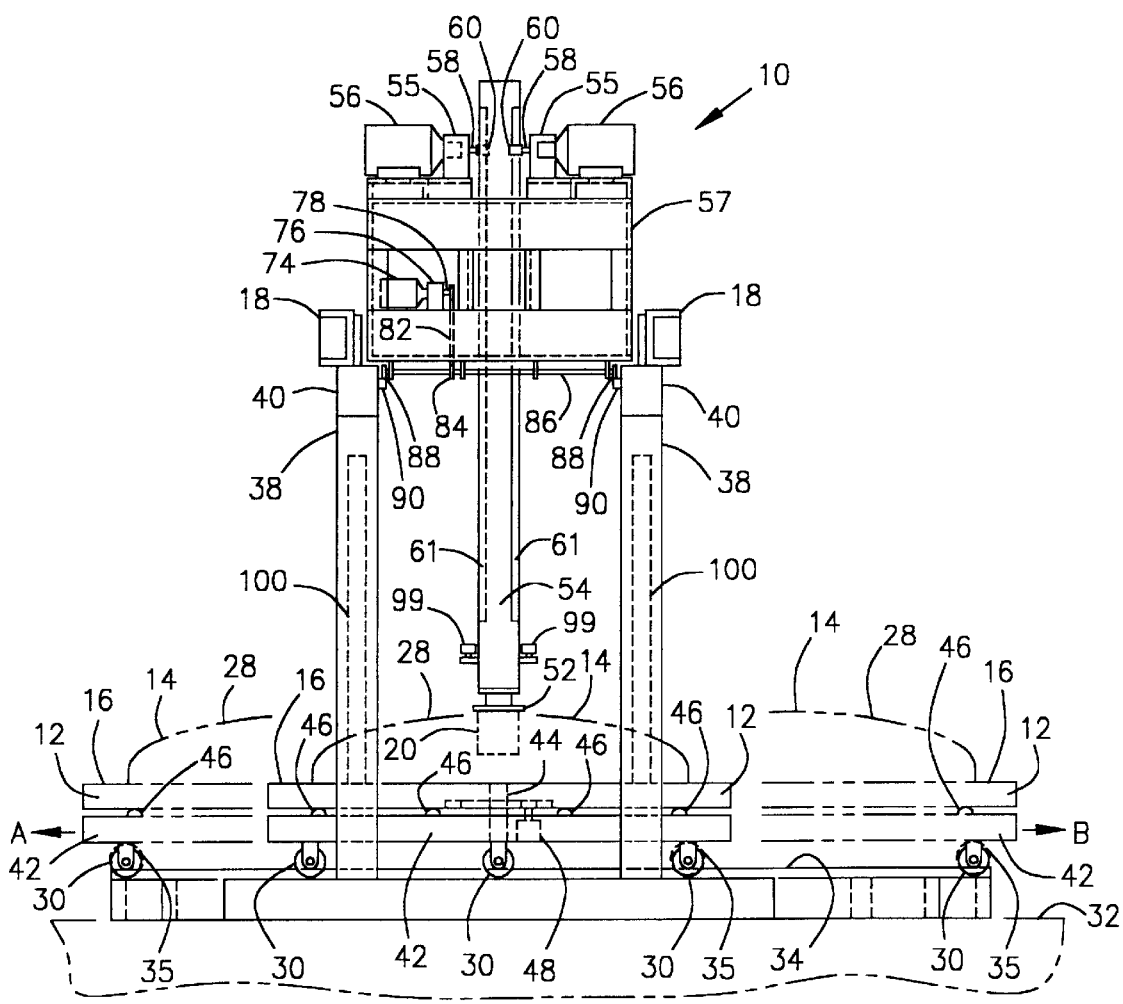
FIG. 4 is a left side elevation taken along line 4—4 of FIG. 2, with the turntable and head shown in three different positions relative to the overhead frame.

Referring also to FIGS. 2, 3 and 4, the movable turntable 12 is provided with turntable wheels 30 that support the turntable 12 above the ground 32. The turntable wheels 30 roll on parallel turntable rails 34. A turntable transport motor 35 is provided on the turntable 12 and attached to one of turntable wheels 30 as a motorized means of moving the movable turntable 12 along the parallel turntable rails 34. As illustrated schematically in FIG. 3 by Line H, a power and control box 50 supplies turntable transport motor 35 with power and controls the operation of the turntable transport motor 35. Thus the turntable 12 and the head 14 can travel in one direction, as illustrated by Arrow A, to position them under the overhead frame 18, and alternately, can travel in an opposite direction, as illustrated by Arrow B, to remove them from under the overhead frame 18.

Once the head 14 has been properly centered on the top surface 16 of the turntable 12, the turntable 12 is moved along the turntable rails 34 so that the head 14 moves parallel with the ground 32 and rolls under the overhead frame 18 of the head fitter 10. The parallel turntable rails 34 are perpendicular to frame rails 36 provided on the overhead frame 18. The overhead frame 18 is provided with frame legs 38 that support horizontal members 40 of the overhead frame 18 above the ground 32. The frame legs 38 straddle the turntable 12, the head 14 that rests on the turntable 12, and the turntable rails 34 on which the turntable 12 travels. The two parallel frame rails 36 secure to the horizontal members 40 of the overhead frame 18 and both the rails 36 and the horizontal members 40 are supported by the frame legs 38 above the turntable 12 and the head 14 as the turntable 12 and the head 14 move on the turntable rails 34 underneath the overhead frame 18.

Referring now to FIGS. 1, 3 and 4, the top surface 16 of the turntable 12 is capable of rotating relative to a non-rotatable lower portion 42 of the turntable 12. To facilitate rotation of the top surface 42, the turntable 12 is provided with a center pivot post 44 that allows the top surface 42 to rotate relative to a center of the turntable 12 and is provided with bearings 46 located between the lower portion 42 of the turntable 12 and the top surface 16 as a means for rotatably supporting the top surface 16 on the lower portion 42 of the turntable 12. The turntable wheels 30 secure to the lower portion 42.

As illustrated in FIGS. 2–4, a turntable motor 48 is provided on the turntable 12 as a motorized means for rotating the top surface 16 of the turntable 12 relative to the non-rotatable lower portion 42 of the turntable 12. As illustrated schematically in FIG. 3 by Line C, the power and control box 50 supplies power to the turntable motor 48 and controls the operation of the turntable motor 48. The power and control box 50 may include manual controls or may include a computer to control the movement of the head fitter 10 and may connect to an electrical power source.

The movable burner 20 is supported on a lower end 52 of a burner ram 54 that movably attaches to a burner carriage 57. Likewise, the movable attachment holder 22 is supported on a lower end 62 of a holder ram 64 that movably attaches to a holder carriage 66. Each of the two carriages, i.e. the burner carriage 57 and the holder carriage 66, travels along the frame rails 36 via carriage wheels 68 that are provided on each carriage 57 and 66. The carriage wheels 68 movably support the carriages 57 and 66 on the frame rails 36. A horizontal member scale 69 is provided on one of the horizontal members 40. The horizontal member scale 69 has a 0 point directly along the path that the center point of the turntable 12 makes as the turntable 12 rolls thereunder and has distance marks on the horizontal member scale 69 in both directions from the 0 point.

Each of the carriages 57 and 66 is provided with a carriage pointer, 71 and 73 respectively. The carriage pointer 71 is positioned on its carriage 57 so that when the carriage pointer 71 is positioned so that it aligns with the 0 point of horizontal member scale 69, then the burner 20 is directly above the center point of the turntable 12 when the turntable 12 is centered under the overhead frame 18. Also, carriage pointer 73 is positioned on its carriage 66 so that when the carriage pointer 73 is positioned so that it aligns with the 0 point of horizontal member scale 69, then the attachment holder 22 is directly above the center point of the turntable 12 when the turntable 12 is centered under the overhead frame 18.

The burner ram 54 and the holder ram 64 are identical to each other except that the movable burner 20 secures to the lower end 52 of the burner ram 54 whereas the movable attachment holder 22 secures to the lower end 62 of the holder ram 64. In all other respects, the two rams 54 and 64 are the same.

Also, the burner carriage 57 and the holder carriage 66 are identical to each other except that the burner carriage 57 supports the burner ram 54 whereas the holder carriage 66 supports the holder ram 64. In all other respects, the two carriages 57 and 66 are the same.

Because the rams 54 and 64 are almost identical to each other and because the carriages 57 and 66 are also almost identical to each other, it is not necessary to describe each. Only one of the rams will be described below in detail and likewise, only one of the carriages will be described below in detail. A detailed description of the burner ram 54 and the burner carriage 57 is provided hereafter, with notations on any difference in the rams 54 and 64 and the carriages 57 and 66 being noted.

The movable burner 20 is mounted on the lower end 52 of a burner ram 54 that can be lowered and raised relative to the head 14 via one or more burner ram motors 56. As illustrated schematically in FIG. 3 by Line D, power and control to each of the burner ram motors 56 are supplied by the power and control box 50. Power and control to each holder ram motor 70 are likewise supplied by the power and control box 50, as illustrated schematically in FIG. 3 by Line E.

Figure 5:
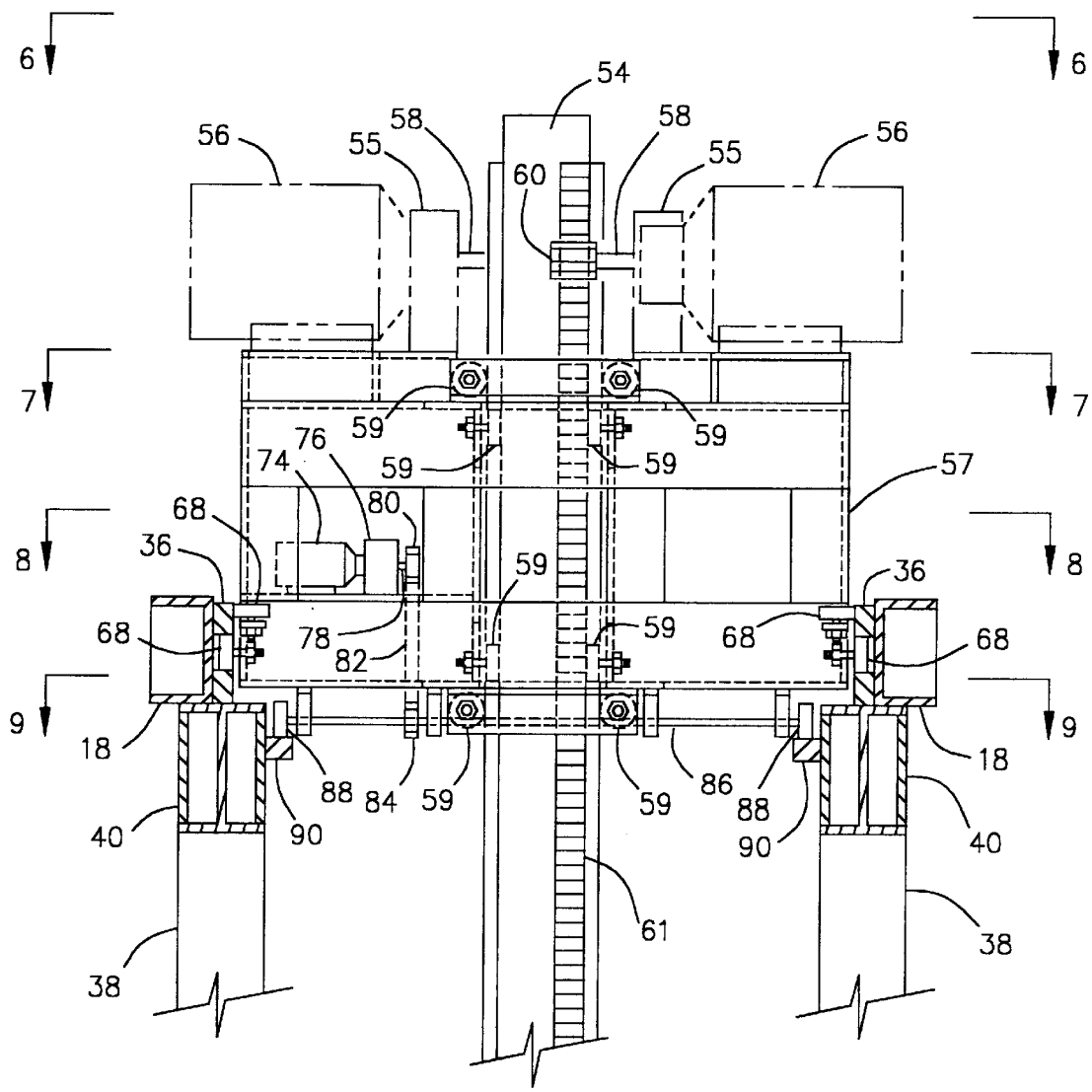
FIG. 5 is a left side elevation taken along line 5—5 of FIG. 3, showing details of the burner carriage and burner ram.
Figure 6:
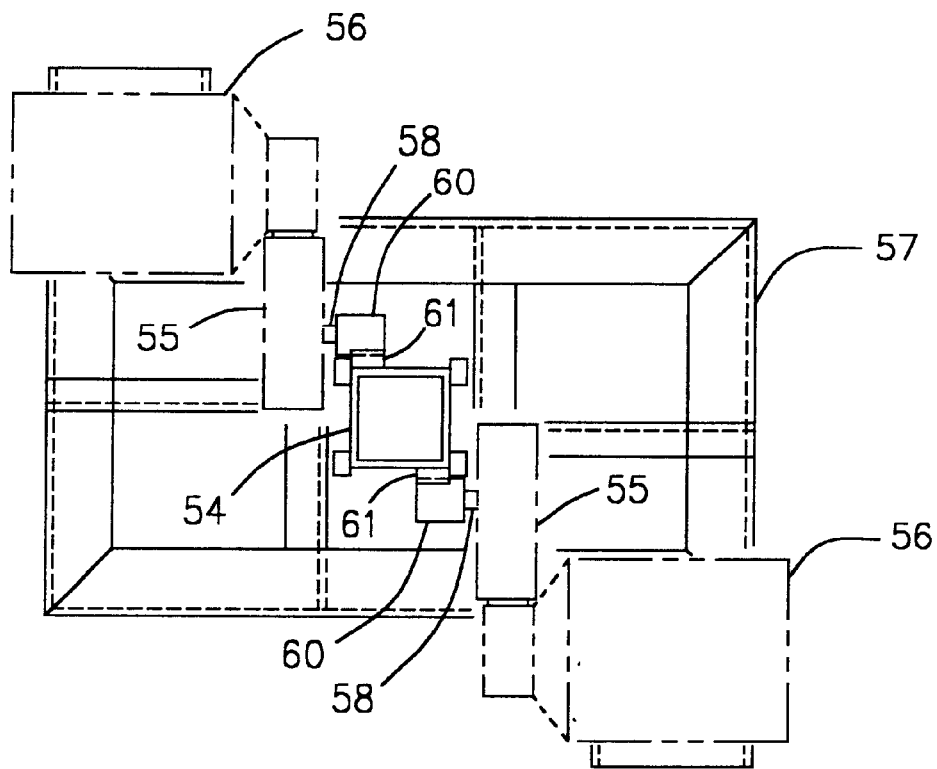
FIG. 6 is a top plan taken along line 6—6 of FIG. 5.
Figure 7:
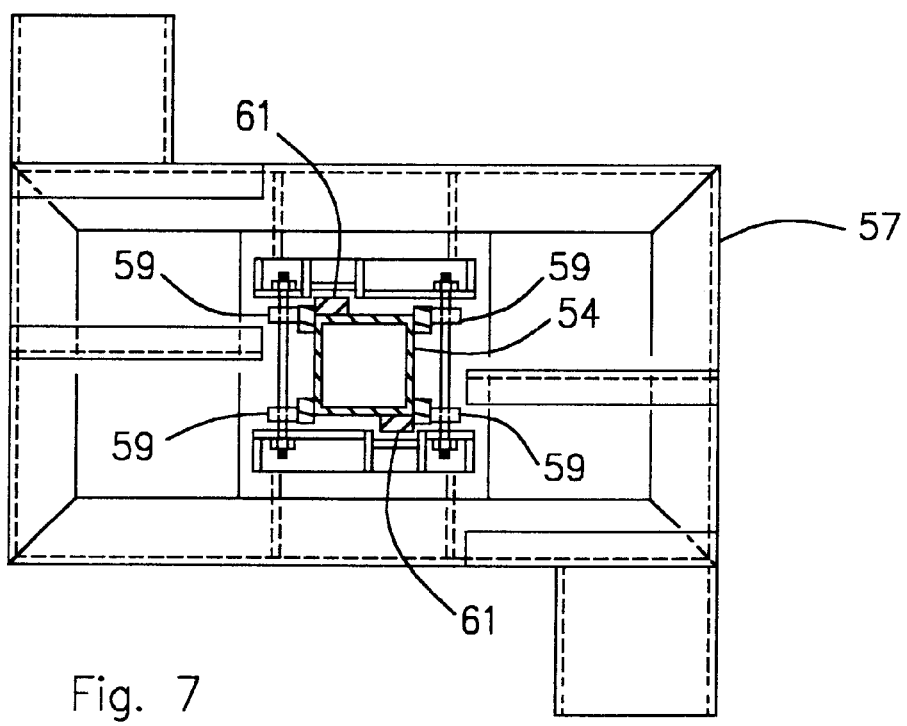
FIG. 7 is a cross sectional view taken along line 7—7 of FIG. 5.
Figure 8:
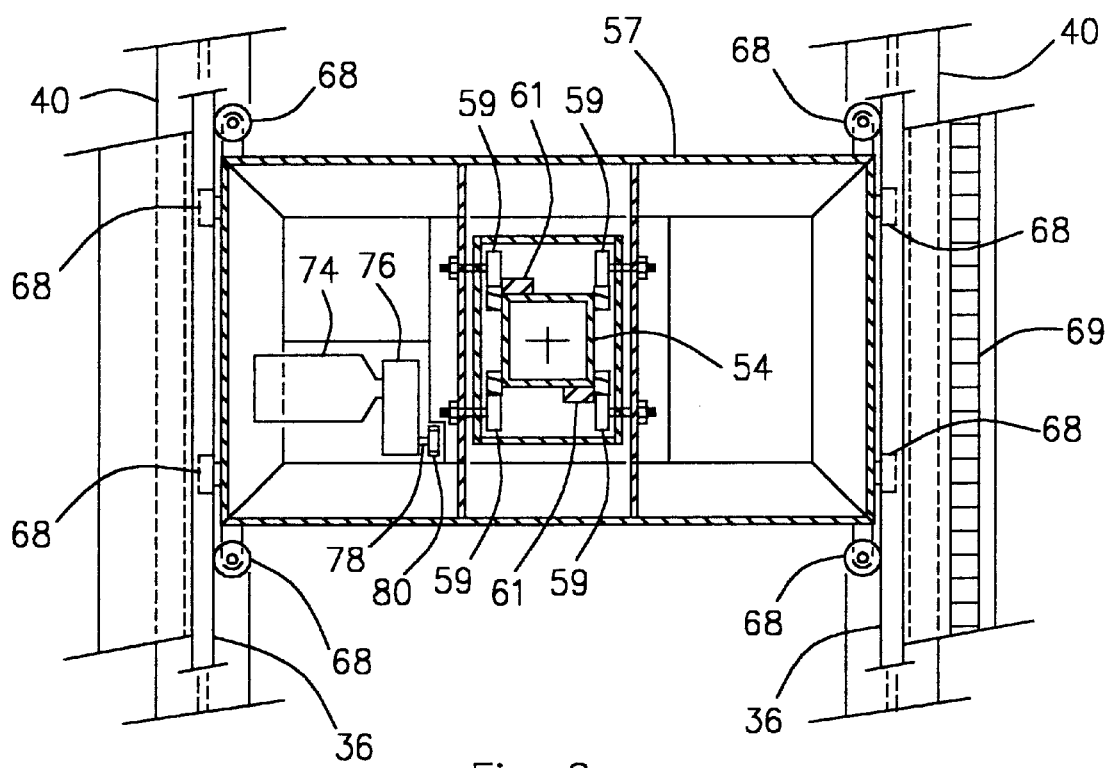
FIG. 8 is a cross sectional view taken along line 8—8 of FIG. 5.
Figure 9:
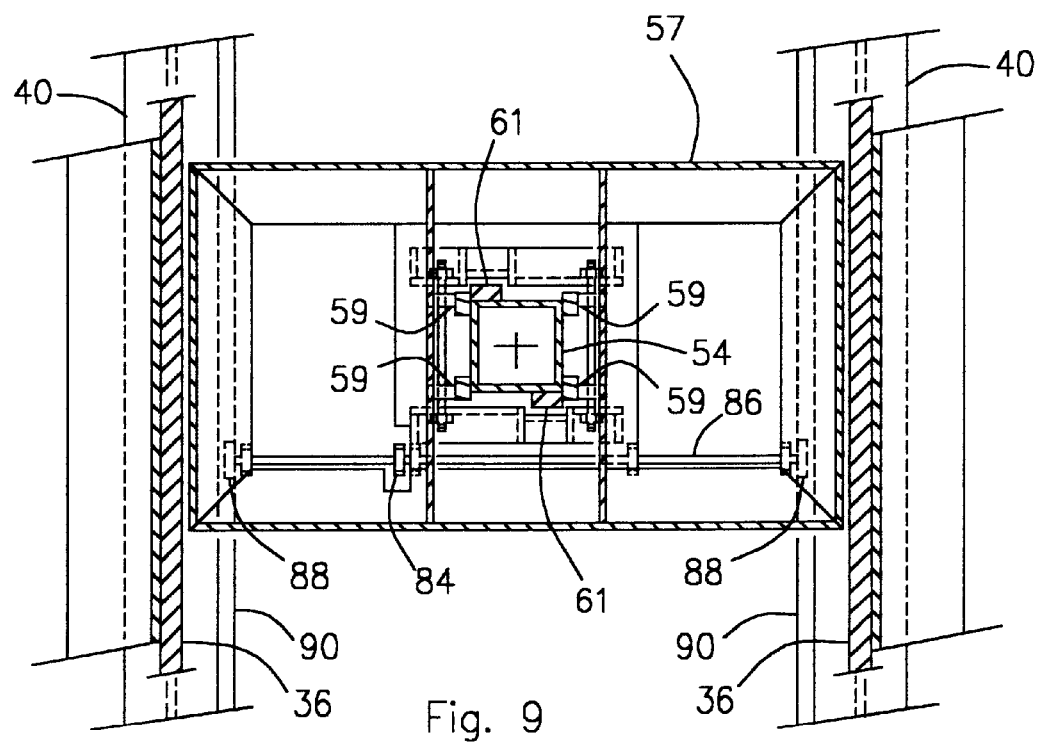
FIG. 9 is a cross sectional view taken along line 9—9 of FIG. 5.

Referring now to FIG. 5, the details of each of the burner ram motors 56 are illustrated. The burner ram motors 56 mount on a burner carriage 57. Each burner ram motor 56 attaches to a gear box 55, each gear box 55 has a shaft 58, and each shaft has a sprocket 60 attached to the shaft 58. Each sprocket 60 rotatably engages a burner gear rack 61 that is provided on the burner ram 54 so that when the burner ram motor 56 is activated to turn the sprocket 60, the burner gear rack 61 and the attached burner ram 54 move upward or downward relative to the burner carriage 57, depending on the direction of rotation of the burner ram shaft 58. In this way, the burner ram 54 movably attaches to the burner carriage 57. Likewise, each of the holder ram motors 70 engages a holder gear rack 72 provided on the holder ram 64.

It may be desirable to have two burner ram motors 56 to prevent the ram 54 from falling. Likewise, two holder ram motors 70 may be desirable.

As illustrated in FIGS. 5–9, the burner ram 54 is provided with several sets of adjustable burner ram wheels 59 that engage the burner carriage 57 and hold the burner ram 54 in the proper vertical orientation. The adjustable burner ram wheels 59 allow the orientation of the burner ram 54 to be adjusted relative to the burner carriage 57 from which the burner ram 54 is movably suspended so that the burner ram 54 can be maintained in an orientation that allows it to always move perpendicular to the ground 32.

As previously described, the burner carriage 57 has carriage wheels 68 that engage the frame rails 36 to support the burner carriage 57 on the frame rails 36 and to allow the burner carriage 57 to be moved along the frame rails 36. Referring to FIGS. 4 and 5, a burner carriage motor 74 is provided on the burner carriage 57 to position the burner ram 54 and burner 20 over the head 14. The burner carriage motor 74 attaches to a carriage gear box 76. The carriage gearbox 76 is provided with a shaft 78 that attaches to a sprocket 80. The sprocket 80 engages a chain drive 82 that engages a spur gear 84 provided on a carriage drive shaft 86. Each of two ends of the carriage drive shaft 86 is provided with a gear 88. The gears 88 engage a horizontal gear rack 90 provided attached on each of the two horizontal members 40. Thus, when the burner carriage motor 74 is activated, the burner carriage 57 moves in the direction of Arrow F or alternately, in the direction of Arrow G, depending on the direction of rotation of the burner carriage motor 74. Although one reversible direction motor has been described for use as burner carriage motor 74, it is obvious that two uni-directional motors could be used instead of one reversible direction motor. Thus, the movable burner 20 can be accurately positioned over the head 14 in order to cut holes 24 in the head 14 at desired locations on the head 14. The burner 20 that is employed may be any automatic portable burners, such as for example, a cutting torch, a plasma arc, or a laser torch.

As previously described, the movable attachment holder 22 is mounted on the lower end 62 of the holder ram 64 that can be lowered and raised relative to the head 14 via one or more holder ram motors 70, and the holder ram 64 movably attaches to the holder carriage 66 that can also be moved, via a holder carriage motor 92 along the frame rails 36 to position the attachment holder 22 over the head 14. An attachment 26, such as for example a valve, nozzle, or flange, removably attaches to the attachment holder 22. For certain attachments 26, such as for example and elbow connector, it may be necessary to employ an adapter (not illustrated) between the attachment holder 22 and the attachment 26 to hold the attachment in the proper orientation. Thus, the movable attachment holder 22 and the attachment 26 can be accurately positioned over the head 14 to properly position the attachment 26 relative to a hole 24 in the head 14 so that the attachment 26 can be tack welded to the head 14. The attachment holder 22 is also provided with a laser light holder pointer 95, as illustrated in FIG. 3, that shines downward onto the head 14 as another way of double checking measurements on the head 14 prior to cutting holes 24.

A worktable 94 is provided on one side of the overhead frame 18 to serve as a workstation for removably securing attachments 26 to the attachment holder 22.

As illustrated in FIG. 3, the turntable 12 is optionally provided with a laser light turntable pointer 96 on the turntable 12 and with an associated horizontal scale 98 attached to the frame legs 38 as a means of properly centering the turntable 12 and the head 14 horizontally relative to the overhead frame 18 and its associated burner 20 and attachment holder 22. In addition, each of the rams 54 and 64 is provided with laser light ram pointers 99 that point to vertical scales 100 provided on the frame legs 38 as a means of checking and adjusting the vertical orientation of the rams 54 and 64. Each ram 54 and 64 is secured to its associated carriage, 57 and 66 respectively, via the adjustable burner ram wheels 59 and adjustable holder ram wheels that are identical to the adjustable burner ram wheels 59, and therefore have not been illustrated. The vertical orientation of the rams 54 and 64 can be adjusted via adjustment of the ram wheels 59 to cause the rams 54 and 64 to be perfectly vertical.

As illustrated in FIG. 1, the top surface 16 of the turntable 12 is also provided with a 0–360 degree scale 102 on its perimeter, and the non-rotatable lower portion 42 of the turntable 12 is provided with an associated turntable pointer 104. This 0–360 degree scale 102 and associated turntable pointer 104 allow the top surface 16 and the head 14 to be properly positioned, i.e. having the desired degree point on the top surface 16 of the turntable 12 aligned with the turntable pointer 104 on the lower portion, so that holes 24 can be cut in the head 14 at the desired degree from the 0 degree point without the need to draw lines on the head 14.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A head fitter for fabricating a tank head comprising:
   a turntable with a rotatable top surface for holding a tank head, said turntable movable relative to an overhead frame, said turntable movably mounted on turntable rails that allow the turntable to move under an overhead frame and move from under the overhead frame,
   a burner and an attachment holder movably mounted on said overhead frame so that the burner and attachment holder can be independently position over the turntable,
   said burner vertically movable relative to the overhead frame so that it can be lowered and raised in order to cut holes in a tank head at desired locations, and
   said attachment holder vertically movable so that it can be lowered and raised in order to properly position an attachment relative to a hole in a tank head so that the attachment can be tack welded to the tank head.

2. A head fitter according to claim 1 further comprising:
   frame rails provided on said overhead frame, a burner carriage and a holder carriage movably mounted on said frame rails so that they can be independently positioned over said turntable,
   said burner movably mounted on said burner carriage so that said burner moves vertically relative to the burner carriage, and
   said attachment holder movably mounted on said holder carriage so that said attachment holder moves vertically relative to the holder carriage.

3. A head fitter according to claim 2 further comprising:
   the top surface of said turntable rotating 360 degrees relative to a non-rotatable lower portion of the turntable, turntable wheels provided on the non-rotatable lower portion of the turntable, said turntable wheels movably engaging said turntable rails in order to move the turntable under the overhead frame and move the turntable from under the overhead frame.

4. A head fitter according to claim 2 further comprising:
   a burner carriage motor attached to the burner carriage for moving the burner carriage along the frame rails, and
   a holder carriage motor attached to the holder carriage for moving the holder carriage along the frame rails.

5. A head fitter according to claim 2 further comprising:
   a burner ram motor attached to the burner carriage for moving the burner vertically relative to the burner carriage, and
   a holder ram motor attached to the holder carriage for moving the attachment holder vertically relative to the holder carriage.

6. A head fitter according to claim 2 further comprising:
   a 0–360 degree scale provided around a perimeter of said rotatable top surface of the turntable, and
   a turntable pointer for pointing at said 0–360 degree scale provided on said non-rotatable lower portion of said turntable as a means for accurately positioning the top surface relative to the non-rotatable lower portion of the turntable.

7. A head fitter according to claim 2 further comprising:
   a horizontal member scale provided on said overhead frame, and a carriage pointer provided on said burner carriage as a means of positioning said burner carriage relative to said overhead frame, and a second carriage pointer provided on said holder carriage as a means of positioning said holder carriage relative to said overhead frame.

8. A head fitter according to claim 2 further comprising:

a turntable light pointer provided on the non-rotatable lower portion of said turntable, and a horizontal scale provided on legs of the overhead frame so that the turntable light pointer shines on the horizontal scale to position the turntable relative to the overhead frame.

9. A head fitter according to claim 2 further comprising:

a burner ram movably mounted on the burner carriage and said burner secured to a lower end of said burner ram, and a holder ram movably mounted on the holder carriage and said attachment holder secured to a lower end of said holder ram.

10. A head fitter according to claim 9 further comprising:

vertical scales provided on legs of the overhead frame, light ram pointers provided on the burner ram so that the light ram pointers shine on the vertical scales to vertically align the burner ram relative to the burner carriage, and light ram pointers provided on the attachment holder ram so that the light ram pointers shine on the vertical scales to vertically align the attachment holder ram relative to the holder carriage.

* * * * *